March 21, 1961  P. M. RODRIGUEZ  2,975,990
FILM REELING MAGAZINE FOR MOVIE CAMERAS
Filed March 19, 1959  2 Sheets-Sheet 1
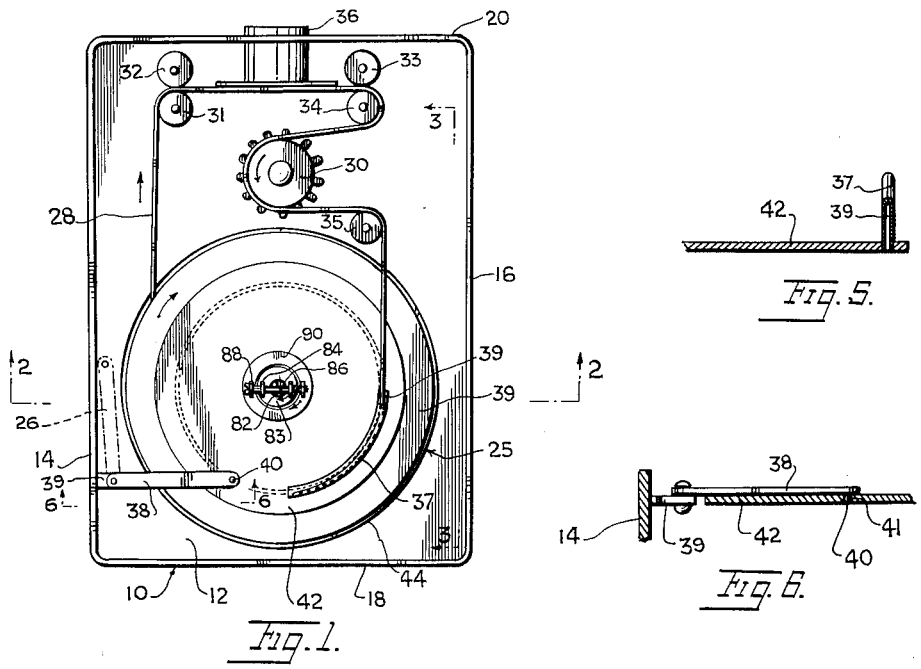
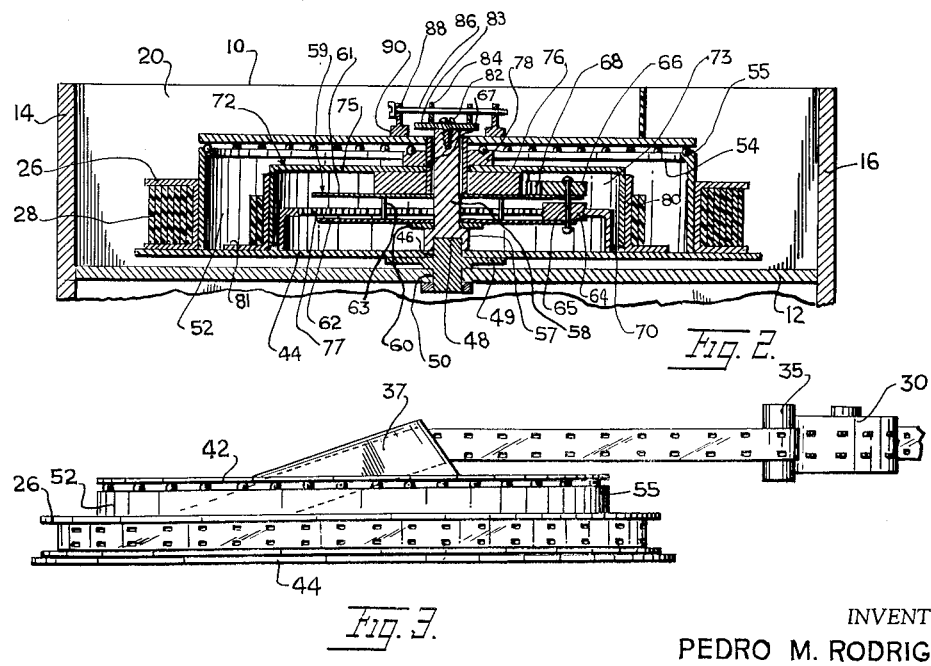
INVENTOR.
PEDRO M. RODRIGUEZ
BY
ATTORNEY

2,975,990

FILM REELING MAGAZINE FOR MOVIE CAMERAS

Pedro M. Rodriguez, 122—19 111th Ave., South Ozone Park, N.Y.

Filed Mar. 19, 1959, Ser. No. 800,547

7 Claims. (Cl. 242—71.2)

This invention concerns a film magazine and more particularly concerns a film reeling mechanism in such a magazine.

The invention has as a principal object the provision of a camera film magazine wherein film is both unwound and wound up simultaneously.

A further object is the provision of a camera film magazine where the film is unwound from a first reel on the outside of the magazine and is simultaneously wound up on a reel located inside of the magazine.

A still further object is the provision of a device for winding film between concentric reels in a camera, including a mechanism for driving one reel faster than the other.

Another object is the provision of a device of the character described wherein the mechanism compensates for relative changes in speeds of rotation of the several reels.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a top plan view of a motion picture camera in simplified form showing the device embodying the invention installed therein.

Fig. 2 is a sectional view on an enlarged scale taken on line 2—2 of Fig. 1.

Fig. 3 is a side view on an enlarged scale of the film magazine and associated film feeding members taken on line 3—3 of Fig. 1.

Fig. 5 is a sectional view taken on line 5—5 of Fig. 4 showing a portion of a cover plate of the device.

Fig. 6 is a sectional view taken on line 6—6 of Fig. 1 showing a holding arm per se employed in the device.

Figure 4:
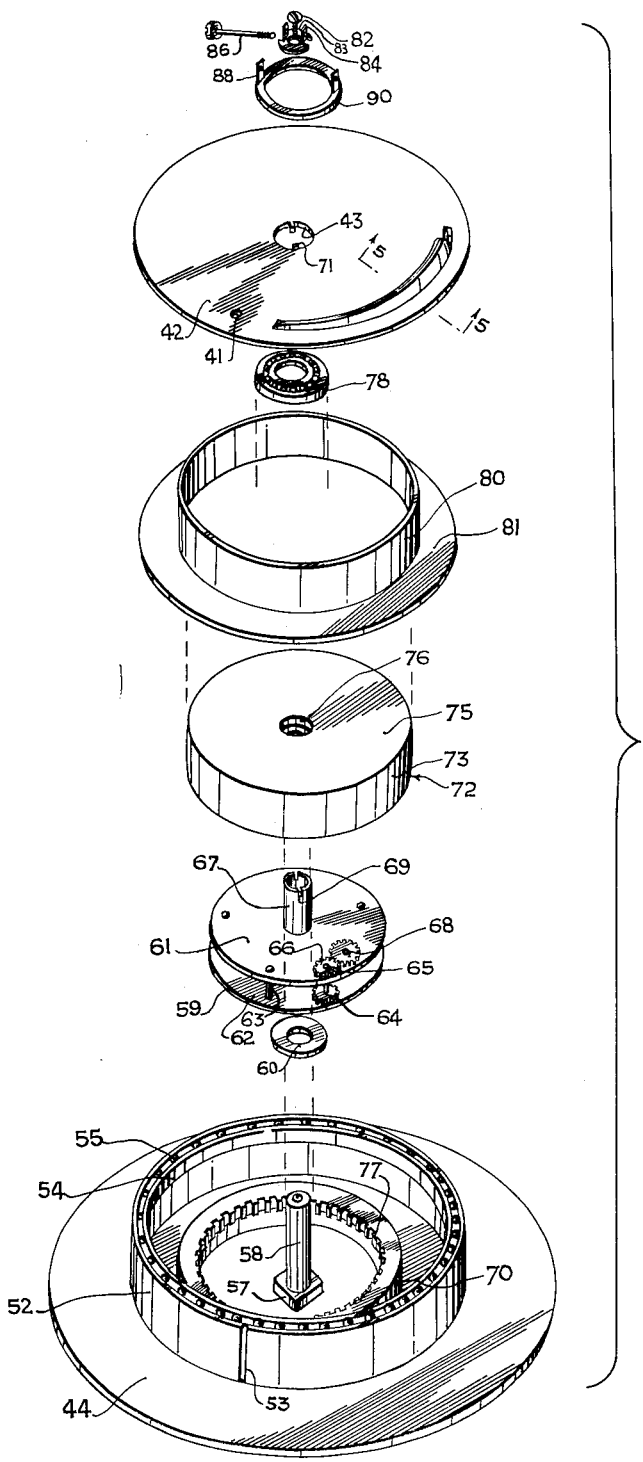
Fig. 4 is an exploded perspective view of the members of the film magazine.

Referring to Fig. 1 there is shown a camera case 10 having an inner base plate 12, side walls 14 and 16, and end walls 18 and 20. The case is open at the top and is intended to be provided with a conventional cover (not shown). A film magazine 25 is mounted within the casing. This magazine carries a removable film supply reel 26 from which film 28 is drawn by a sprocket wheel 30. The film passes between idler rollers 31, 32 and 33, 34 at the rear of a lens assembly 36. The film passes around sprocket wheel 30 and an idler roller 35 and enters an inclined arcuate chute 37 at the top of the magazine. An arm 38 is pivotally carried by hinge member 39 on side wall 14. This arm, as best shown in Fig. 6, carries a depending pin 40 disposed to fit in an opening 41 of the cover plate 42 to prevent rotation thereof while the reel 26 rotates. The arm is pivotable to one side away from the magazine as shown in dotted lines in Fig. 1.

The magazine 25 includes a base plate 44 best shown in Figs. 2 and 4. This plate is circular in form and has a centrally located rectangular or square hole 46 through which extends a rectangular boss 48. The boss is formed on a flange plate 49 which supports the plate 44 on plate 12 for rotation in the case 10. The flange plate 49 has a shaft journaled frictionally in an aperture 50 in plate 12.

A cylindrical wall 52 is formed inwardly of the rim of plate 44 and serves as a hub upon which reel 26 is mounted. The wall is provided with an indentation or groove 53 (see Fig. 4) adapted to receive a projecting key (not shown) disposed on the inside of the reel to prevent rotation of the reel with respect to the wall 52. The upper edge of wall 52 is formed with a ball bearing race 54 having ball bearings 55 therein to insure a substantially frictionless support for cover plate 42 which is held stationary by arm 38 while the reel 26 and adjoining wall 52 rotate.

Secured to the center of plate 44 is a post 58. The post is formed with a shoulder 57 on which is disposed a washer 60 and a frame 59 consisting of two circular plates 61 and 62 held in spaced relationship by spacer members 63. Between plates 61 and 62 is a gear 64 which rotates on a spindle 65. This spindle extends beyond plate 61 and carries another gear 66 thereon. A further gear 68 is rotatably mounted on plate 61 and meshes with gear 66. The lower gear 64 is disposed to mesh with an internally toothed ring gear 77 formed as an inwardly extending flange on a cylindrical ring 70. Ring 70 is secured to the plate 44 concentric with the post 58. An inverted cup 72 having a cylindrical wall 73 and a flat circular top wall 75 is disposed over frame 59. At the underside of top wall 75 is securely mounted a gear 76 centrally disposed to mesh with gear 68. Both the top 75 and gear 76 are centrally apertured so that they fit loosely on the post 58. A ball bearing race 78 is disposed between the top wall 75 and the cover plate 42 so that the cup can rotate with respect to the cover plate.

A cylindrical reel 80 fits frictionally on the cylindrical wall 73 of cup 72 and rotates therewith but can slip frictionally with respect to wall 73 in a manner which will be described. Reel 80 has a base flange 81 to support film wound on the reel.

Removably secured by screw 82 to the top of post 58 is a clip 83 having upstanding apertured fingers 84 through which pass a bolt 86. The bolt also passes through apertures in upstanding fingers 88 of a washer 90. The washer serves to hold the cover plate 42 on the post 58. A sleeve 67 is secured to plate 61 of frame 59 and is disposed concentrically with post 58 over which it fits loosely. The upper end of the sleeve is radially slotted at 69. Into these slots fit the lugs 71 extending inwardly at the central aperture 43 of plate 42. Plate 42 holds sleeve 67 and the frame 59 stationary during operation of the device.

In operation of the device, film 28 will be drawn off of reel 26 at a constant speed by the drive sprocket wheel 30. The film will be passed behind the lens for exposure thereat and will then be passed via roller 35 into chute 37. This chute has a narrow passage 39 which guides the film downwardly on to reel 80 upon which the film is threaded inside of cup 52. As the film is drawn off of reel 26 it rotates cup 52 which causes rotation of plate 44 and ring gear 77. Gear 77 drives the small gears 64, 66 at a more rapid rate of rotation than gear 77. Gear 66 drives small gear 68 at substantially the same rate of rotation. Gear 76 is larger than gear 68 but smaller than gear 77 so that it rotates faster than gear 77. As gear 77 rotates it drives the cup 72 and the frictionally engaged reel 80. Reel 80 rotates in the same direction as reel 26 but at a faster rate. This is necessary because reel 80 has a smaller diameter than reel 26 and must thus rotate faster to reel in the film as rapidly as it is fed by sprocket wheel 30. The frame 59 is held stationary along with plate 42 by arm 38.

It will be noted that as reel 26 rotates, the diameter of the roll of film it carries decreases, while the diameter of the roll of film carried by reel 80 increases. It is therefore necessary that the angular rotation of reel 80 be slowed progressively so that the take-up reel 80 reels in the film at the same linear speed as reel 26 discharges the film. This is effected by the slippage which occurs in friction clutch fashion between reel 80 and wall 73 of cup 72. Slippage occurs because reel 80 tends to rotate faster than necessary so that the film is fed without slack to the reel. The taut film exerts a retarding force upon the reel 80 so that the circumferential linear speed of the roll of film on reel 80 is adjusted exactly to the constant linear speed at which the film is fed drawn from reel 26.

The last short length of the film remaining outside of the magazine when the film is fully discharged from reel 26 may be cut off, since this last short length is generally provided as wastage for reeling purposes. The magazine will now contain the fully exposed film on reel 80 which can be removed for development.

Removal of the reel 80 is accomplished by first removing bolt 86, washer 90 and clip 83 to release the cover plate. The flexible arm 38 will be turned aside, and the cover plate 42 will be removed to expose the reel 80. The reel 80 may also be made in a light-tight construction with a slot to permit entry of the exposed film.

The mechanism described makes possible a very compact camera structure since only one magazine serves as the support for the supply and take-up reels. The device is simple, rugged and economical to manufacture.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A film magazine for a motion picture camera having a drive sprocket wheel for drawing a film past a lens assembly, comprising a rotatable base plate, an annular supply reel of said film disposed on said plate, said plate having a cylindrical wall, a take-up reel concentrically disposed within said supply reel, a support concentrically disposed within and frictionally engaging said take-up reel, a cover plate supported by said wall, a chute formed in said cover plate for feeding said film from said drive sprocket wheel to said take-up reel, and gears means operatively connecting said base plate and support for driving the take-up reel at a faster angular speed than the supply reel and base plate, said gear means comprising a plurality of rotatable meshed gears, a frame supporting said gears, and means holding said frame stationary while said gears rotate.

2. A film magazine for a motion picture camera having a drive sprocket wheel for drawing a film past a lens assembly, comprising a rotatable base plate, an annular supply reel of said film disposed on said plate, said plate having a cylindrical wall, a take-up reel concentrically disposed within said supply reel, a support concentrically disposed within and frictionally engaging said take-up reel, a cover plate supported by said wall, a chute formed in said cover plate for feeding said film from said drive sprocket wheel to said take-up reel, and gear means operatively connecting said base plate and support for driving the take-up reel at a faster angular speed than the supply reel and base plate, said gear means comprising a plurality of rotatable meshed gears, a frame supporting said gears, and a ring gear carried by said base plate and meshed with one of said gears, another gear meshed with another of said gears.

3. A film magazine for a motion picture camera having a drive sprocket wheel for drawing a film past a lens assembly, comprising a rotatable base plate, an annular supply reel of said film disposed on said plate, said plate having a cylindrical wall, a take-up reel concentrically disposed within said supply reel, a support concentrically disposed within and frictionally engaging said take-up reel, a cover plate supported by said wall, a chute formed in said cover plate for feeding said film from said drive sprocket wheel to said take-up reel, and gear means operatively connecting said base plate and support for driving the take-up reel at a faster angular speed than the supply reel and base plate, said gear means comprising a plurality of rotatable meshed gears, a frame supporting said gears, a ring gear carried by said base plate and meshed with one of said gears, another gear meshed with another of said gears, a sleeve connecting said frame and cover plate, and means for holding said cover plate and frame stationary while the reels rotate.

4. A film magazine for a motion picture camera having a drive sprocket wheel for drawing a film past a lens assembly, comprising a rotatable base plate, an annular supply reel of said film disposed on said plate, said plate having a cylindrical wall, a take-up reel concentrically disposed within said supply reel, a support concentrically disposed within said take-up reel, a cover plate supported by said wall, a chute formed in said cover plate for feeding said film from said drive sprocket wheel to said take-up reel, and gear means operatively connecting said base plate and support for driving the take-up reel at a faster angular speed than the supply reel and base plate, said gear means comprising a plurality of rotatable meshed gears, a frame supporting said gears, a ring gear carried by said base plate and meshed with one of said gears, another gear meshed with another of said gears, a sleeve connecting said frame and cover plate, and means for holding said cover plate and frame stationary while the reels rotate, said support being an inverted cup having a cylindrical wall frictionally engaged with said take-up reel and permitting slippage therebetween to adjust the angular speed of rotation of the take-up reel.

5. A film magazine for a motion picture camera having a drive sprocket wheel for drawing a film past a lens assembly, comprising a rotatable base plate, an annular supply reel of said film disposed on said plate, said plate having a cylindrical wall, a take-up reel concentrically disposed within said supply reel, a support concentrically disposed within said take-up reel, a cover plate supported by said wall, a chute formed in said cover plate for feeding said film from said drive sprocket wheel to said take-up reel, and gear means operatively connecting said base plate and support for driving the take-up reel at a faster angular speed than the supply reel and base plate, said gear means comprising a plurality of rotatable meshed gears, a frame supporting said gears, a ring gear carried by said base plate and meshed with one of said gears, another gear meshed with another of said gears, a sleeve connecting said frame and cover plate, and means for holding said cover plate and frame stationary while the reels rotate, said support being an inverted cup having a cylindrical wall frictionally engaged with said take-up reel and permitting slippage therebetween to adjust the angular speed of rotation of the take-up reel, there being ball bearing means disposed between the cover plate and said wall, and further ball bearing means disposed between the cover plate and said cup, whereby the base plate and cup rotate while the cover plate remains stationary.

6. A film magazine for a motion picture camera having a drive sprocket wheel for drawing a film past a lens assembly, comprising a rotatable base plate, an annular supply reel of said film disposed on said plate, said plate having a cylindrical wall, a take-up reel concentrically disposed within said supply reel, a support concentrically disposed within said take-up reel, a cover plate supported by said wall, a chute formed in said cover plate for feeding said film from said drive sprocket wheel to said take-up reel, and gear means operatively connecting said base plate and support for driving the take-up reel at a faster angular speed than the supply reel and base plate, said gear means comprising a plurality of rotatable meshed gears, a frame supporting said gears, a ring gear carried by said base plate and meshed with one of said gears, another gear meshed with another of said gears, a sleeve connecting said frame and cover plate, and means for holding said cover plate and frame stationary while the reels rotate, said support being an inverted cup having a cylindrical wall frictionally engaged with said take-up reel and permitting slippage therebetween to adjust the angular speed of rotation of the take-up reel, a post secured centrally to the base plate and extending through said frame, cup and cover plate, and means on said post removably retaining the cover plate on said wall.

7. A film magazine for a motion picture camera having a drive sprocket wheel for drawing a film past a lens assembly, comprising a rotatable base plate, an annular supply reel of said film disposed on said plate, said plate having a cylindrical wall, a take-up reel concentrically disposed within said supply reel, a support concentrically disposed within said take-up reel, a cover plate supported by said wall, a chute formed in said cover plate for feeding said film from said drive sprocket wheel to said take-up reel, and gear means operatively connecting said base plate and support for driving the take-up reel at a faster angular speed than the supply reel and base plate, said gear means comprising a plurality of rotatable meshed gears, a frame supporting said gears, a ring gear carried by said base plate and meshed with one of said gears, another gear meshed with another of said gears, a sleeve connecting said frame and cover plate, and means for holding said cover plate and frame stationary while the reels rotate, said support being an inverted cup having a cylindrical wall frictionally engaged with said take-up reel and permitting slippage therebetween to adjust the angular speed of rotation of the take-up reel, there being ball bearing means disposed between the cover plate and said wall, and further ball bearing means disposed between the cover plate and said cup, whereby the base plate and cup rotate while the cover plate remains stationary, a post secured centrally to the base plate and extending through said frame, cup, further ball bearing means and cover plate, and means removably retaining the cover plate on said wall.

References Cited in the file of this patent

UNITED STATES PATENTS

| | | |
|---|---|---|
| 2,120,724 | Williams | June 14, 1938 |
| 2,217,036 | Williams | Oct. 8, 1940 |
| 2,756,940 | Lessler | July 31, 1956 |